United States Patent
Taninouchi et al.

(10) Patent No.: US 9,616,639 B2
(45) Date of Patent: Apr. 11, 2017

(54) TIN-PLATED COPPER-ALLOY MATERIAL FOR TERMINAL HAVING EXCELLENT INSERTION/EXTRACTION PERFORMANCE

(75) Inventors: Yuki Taninouchi, Naka (JP); Naoki Kato, Naka (JP); Kenji Kubota, Naka (JP)

(73) Assignee: MISTUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/236,711

(22) PCT Filed: Aug. 10, 2012

(86) PCT No.: PCT/JP2012/070485
§ 371 (c)(1),
(2), (4) Date: Feb. 3, 2014

(87) PCT Pub. No.: WO2013/024814
PCT Pub. Date: Feb. 21, 2013

(65) Prior Publication Data
US 2014/0170436 A1    Jun. 19, 2014

(30) Foreign Application Priority Data

Aug. 12, 2011 (JP) .................................. 2011-177310
Jan. 26, 2012 (JP) .................................. 2012-014381

(51) Int. Cl.
*B32B 15/01* (2006.01)
*C25D 3/38* (2006.01)
(Continued)

(52) U.S. Cl.
CPC ............... *B32B 15/01* (2013.01); *C25D 5/10* (2013.01); *C25D 5/505* (2013.01); *H01B 1/026* (2013.01);
(Continued)

(58) Field of Classification Search
None
See application file for complete search history.

(56) References Cited

U.S. PATENT DOCUMENTS

2003/0186597 A1*  10/2003  Suzuki et al. ................ 439/886
2005/0037229 A1*   2/2005  Tanaka .......................... 428/647
(Continued)

FOREIGN PATENT DOCUMENTS

CN         1985333 A      6/2007
CN       101426960 A      5/2009
(Continued)

OTHER PUBLICATIONS

Supplementary European Search Report mailed Mar. 24, 2015, issued for the European patent application No. 12824109.8.
(Continued)

*Primary Examiner* — Vera Katz
(74) *Attorney, Agent, or Firm* — Locke Lord LLP; James E. Armstrong, IV; Nicholas J. DiCeglie, Jr.

(57) ABSTRACT

Tin-plated copper-alloy material for terminal in which: a Sn-based surface layer is formed on a surface of a substrate made of Cu alloy, and a Cu—Sn alloy layer is formed between the Sn-based surface layer and the substrate; the Cu—Sn alloy layer is an alloy layer containing $Cu_6Sn_5$ as a major proportion and having a compound in which a part of Cu in the $Cu_6Sn_5$ is substituted by Ni and Si in the vicinity of a boundary face at the substrate side; an average thickness of the Sn-based surface layer is 0.2 μm or more and 0.6 μm or less; an oil-sump depth Rvk of the Cu—Sn alloy layer is 0.2 μm or more; an area rate of the Cu—Sn alloy layer exposed at a surface of the Sn-based surface layer is 10% or more and 40% or less; and dynamic friction coefficient is 0.3 or less.

5 Claims, 6 Drawing Sheets

(51) Int. Cl.
*C25D 3/30* (2006.01)
*C25D 5/10* (2006.01)
*C25D 5/50* (2006.01)
*H01B 1/02* (2006.01)
*C25D 7/06* (2006.01)

(52) U.S. Cl.
CPC ............... *C25D 3/30* (2013.01); *C25D 3/38* (2013.01); *C25D 7/0614* (2013.01); *Y10T 428/12715* (2015.01)

(56) References Cited

U.S. PATENT DOCUMENTS

2007/0072077 A1* 3/2007 Kusumoto et al. ........ 429/218.1
2008/0090096 A1   4/2008 Suzuki et al.
2008/0257581 A1  10/2008 Masago et al.
2009/0176125 A1   7/2009 Hatano
2014/0004373 A1*  1/2014 Taninouchi et al. .......... 428/573
2014/0287262 A1*  9/2014 Kato et al. .................... 428/647
2015/0056466 A1*  2/2015 Kato et al. .................... 428/647
2015/0184302 A1*  7/2015 Inoue et al. .................. 428/647

FOREIGN PATENT DOCUMENTS

EP   2369688 A1    9/2011
JP   2007-063624 A  3/2007
JP   2007-100220 A  4/2007
JP   2011-204617 A 10/2011

OTHER PUBLICATIONS

International Search Report dated Nov. 20, 2012, issued for PCT/JP2012/070485.

* cited by examiner

TIN-PLATED COPPER-ALLOY MATERIAL FOR TERMINAL HAVING EXCELLENT INSERTION/EXTRACTION PERFORMANCE

FIELD OF THE INVENTION

The present invention relates to tin-plated copper-alloy material for terminal that is useful for a terminal for a connector used for connecting electrical wiring of automobiles or personal products, in particular, which is useful for a terminal for a multi-pin connector.

Priority is claimed on Japanese Patent Application No. 2011-177310, filed on Aug. 12, 2011 and Japanese Patent Application No. 2012-14381, filed on Jan. 26, 2012, the content of which is incorporated herein by reference.

BACKGROUND ART

Tin-plated copper-alloy material for terminal is formed by reflowing after Cu-plating and Sn-plating on a substrate made of copper alloy so as to have a Sn-based surface layer as a surface layer and a Cu—Sn alloy layer as a lower layer, and is widely used as material for terminal.

In recent years, for example, electrification is rapidly progressed in vehicle and circuits are increased in the electrical equipment, so that connector used in the circuit is remarkably downsized and the pins thereof are increased. When the connector have a lot of pins, even though a force for inserting the connector for a pin is small, a large force is required for inserting the connector for all pins; therefore, it is apprehended that productivity is deteriorated. Accordingly, it is attempted to reduce the force for inserting for a pin by reducing the friction coefficient of tin-plated copper-alloy material.

For example, it is described that a surface-exposure rate of the Cu—Sn alloy layer is defined by roughing the substrate (in Patent Document 1). However, there are problems of increasing contact resistance or deteriorating soldering wettability. Also, it is described that average of roughness of the Cu—Sn alloy layer is defined (in Patent Document 2). However, for example, there is a problem in which a dynamic friction coefficient cannot be reduced to 0.3 or less for furthermore improving insertion/extraction performance.

PRIOR ART DOCUMENTS

Patent Documents

Patent Document 1: Japanese Unexamined Patent Application, First Publication No. 2007-100220
Patent Document 2: Japanese Unexamined Patent Application, First Publication No. 2007-63624

SUMMARY OF THE INVENTION

Problems to be Solved by the Invention

In order to reduce the friction coefficient of tin-plated copper-alloy material for terminal, it is effective to thin the Sn-layer at the surface layer, so that a part of the Cu—Sn alloy layer that is harder than Sn is exposed at the surface layer; as a result, the friction coefficient can be extremely reduced. However, if the Cu—Sn alloy layer is exposed at the surface layer, Cu oxide is generated at the surface layer. As a result, the contact resistance is increased and the soldering wettability is deteriorated. Furthermore, even though the average of the surface roughness of the Cu—Sn alloy layer is controlled, the dynamic friction coefficient cannot be reduced to 0.3 or less.

The present invention is achieved in consideration of the above circumstances, and has an object of reducing dynamic friction coefficient to 0.3 or less with an excellent electrical-connection characteristic so as to provide tin-plated copper-alloy material for terminal with an excellent insertion/extraction performance.

Means for Solving the Problem

The inventors recognized that it is advantageous for reducing the dynamic friction coefficient that the outermost Sn layer is thin and the lower Cu—Sn layer is slightly exposed at the surface of the Sn layer. In this recognition, by pursuing extensive studies, the inventors found that: in order to prevent deterioration of electrical-connection characteristic that is caused by reducing the thickness of the Sn layer, it is necessary to control surface exposure of the Cu—Sn alloy layer in a limited range. Finally, the inventors concluded that a shape of a boundary face between the Sn layer and the lower Cu—Sn layer is important. That is to say, it was found as a result of studies that: because the dynamic friction coefficient is largely influenced by a construction from the surface to several hundred nm of depth, if the vicinity of the surface layer is composite construction of Sn and Cu—Sn, soft Sn between the hard Cu—Sn alloy layers lubricates so that the dynamic friction coefficient can be reduced. In this case, the inventors found that it is important that the boundary face between the Sn layer and the Cu—Sn layer has precipitous asperity, and focused an oil-sump depth Rvk as a shape of the boundary face. Furthermore, it is also found that the existence of Ni and Si is important in order to obtain the preferred oil-sump depth Rvk. In the above recognition, the inventors found following means for solving the problems.

Namely, tin-plated copper-alloy material for terminal according to the present invention is a tin-plated copper-alloy material for terminal in which: a Sn-based surface layer is formed on a surface of a substrate made of Cu alloy, and a Cu—Sn alloy layer is formed between the Sn-based surface layer and the substrate; the Cu—Sn alloy layer is an alloy layer containing $Cu_6Sn_5$ as a major proportion and having a compound in which a part of Cu in the $Cu_6Sn_5$ is substituted by Ni and Si in the vicinity of a boundary face at the substrate side; an oil-sump depth Rvk of the Cu—Sn alloy layer is 0.2 μm or more; an average thickness of the Sn-based surface layer is 0.2 μm or more and 0.6 μm or less; an area rate of the Cu—Sn alloy layer exposed at a surface of the Sn-based surface layer is 10% or more and 40% or less; and dynamic friction coefficient is 0.3 or less.

The oil-sump depth Rvk of the Cu—Sn alloy layer is set to 0.2 μm or more; the average thickness of the Sn-based surface layer is set to 0.2 μm or more and 0.6 μm or less; and the exposed-area rate of the Cu—Sn alloy layer is set to 10% or more and 40% or less at the surface of the Sn-based surface layer, so that the dynamic friction coefficient can be realized to be 0.3 or less. In this case, by an existence of the $(Cu, Ni, Si)_6Sn_5$ alloy in which a part of Cu is substituted by Ni and Si which is formed in a lower part of the Cu—Sn alloy layer, the Cu—Sn alloy layer has precipitous asperity and the Rvk is 0.2 μm or more, so that the area rate exposed at the surface is limited in a limited range.

If the oil-sump depth Rvk of the Cu—Sn alloy layer is less than 0.2 μm, a small quantity of Sn exists between Cu—Sn, so that the dynamic friction coefficient cannot be restrained to 0.3 or less. Preferable oil-sump depth Rvk is 0.3 μm or more.

The average thickness of the Sn-based surface layer is set in the range of 0.2 μm or more to 0.6 μm or less, because: if it is less than 0.2 μm, the soldering wettability and electrical-connection reliability may be deteriorated; and if it is more than 0.6 μm, the surface layer cannot be the composite construction of Sn and Cu—Sn and may be filled only by Sn, so that the dynamic friction coefficient is increased. More preferred average thickness of the Sn-based surface layer is 0.25 μm or more and 0.5 μm or less.

If the exposed-area rate of the Cu—Sn alloy layer at the surface of the Sn-based surface layer is less than 10%, the dynamic friction coefficient cannot be suppressed to 0.3 or less; and if it exceeds 40%, the electrical-connection characteristic such as the soldering wettability and the like is deteriorated. More preferred area rate is 10% or more and 30% or less.

In addition, it is known that the dynamic friction coefficient of the Sn-based surface layer is increased when a vertical load for measuring the dynamic friction coefficient is decreased; however, the present invention can be operative for small terminals because the dynamic friction coefficient is scarcely varied even though the vertical load is decreased.

In the tin-plated copper-alloy material for terminal of the present invention, it is preferable that equivalent-circle diameters of exposed portions of the Cu—Sn alloy layer exposed at the surface of the Sn-based surface layer be 0.6 μm or more to 2.0 μm or less.

If the equivalent-circle diameters of the exposed portions of the Cu—Sn alloy layer which are exposed at the surface of the Sn-based surface layer are less than 0.6 μm, the exposed-area rate of the Cu—Sn alloy layer cannot be 10% or more with the thickness of the Sn-based surface layer satisfying a desired range; and if it exceeds 2.0 μm, the soft Sn between the hard Cu—Sn alloy layer cannot lubricate enough, so that the dynamic friction coefficient cannot be suppressed to 0.3 or less. More preferred equivalent-circle diameter is 0.6 μm or more to 1.3 μm or less.

In the tin-plated copper-alloy material for terminal according to the present invention, it is preferable that an average thickness of the Cu—Sn alloy layer be 0.6 μm or more and 1 μm or less.

If the average thickness of the Cu—Sn alloy layer is less than 0.6 μm, it is difficult to make the oil-sump depth Rvk to 0.2 μm or more. If it is formed to have a thickness of 1 μm or more, it is wasteful because the Sn-based surface layer should be made thicker than necessary.

In the tin-plated copper-alloy material for terminal according to the present invention, it is preferable that the substrate contain: 0.5% or more and 5% or less by mass of Ni and 0.1% or more and 1.5% or less by mass of Si; furthermore 5% or less by mass in total of one or more selected from a group consisting of Zn, Sn, Fe and Mg if necessary; and a balance which is composed of Cu and unavoidable impurities.

In order to obtain 0.2 μm or more of the oil-sump depth Rvk of the Cu—Sn based surface layer, it is necessary to dissolve Ni and Si into the Cu—Sn alloy layer. In this case, if the substrate containing Ni and Si is used, it is possible to supply Ni and Si from the substrate into the Cu—Sn alloy layer while reflowing. However, with respect to contents of Ni and Si in the substrate: the effectiveness of Ni and Si cannot be obtained if that of Ni is less than 0.5% by mass and that of Si is less than 0.1% by mass; if that of Ni exceeds 5% by mass, cracking may occur when casting or hot-rolling; and if that of Si exceeds 1.5% by mass, conductivity may be deteriorated. Therefore, it is preferable that Ni be set to 0.5% or more and 5% or less by mass, and Si be set to 0.1% or more and 1.5% or less by mass.

It is preferable that Zn and Sn be added for improving strength and heat resistance; and Fe and Mg be added for improving stress-relief property. It is undesirable that it exceeds 5% by mass in total because the electrical conductivity is deteriorated.

A method for producing tin-plated copper-alloy material for terminal according to the present invention, in which a Sn-based surface layer is formed through a medium of a Cu—Sn alloy layer on a substrate by reflowing after forming a Cu-plating layer and a Sn-plating layer in sequence on the substrate made of Cu alloy, having steps of: using the substrate containing 0.5% or more and 5% or less by mass of Ni and 0.1% or more and 1.5% or less by mass of Si; furthermore 5% or less by mass in total of one or more selected from a group consisting of Zn, Sn, Fe and Mg if necessary; and a balance which is composed of Cu and unavoidable impurities; setting a thickness of the Cu-plating layer to 0.03 μm or more and 0.14 μm or less; setting a thickness of the Sn-plating layer to 0.6 μm or more and 1.3 μm or less; and reflowing by rapid-cooling surface temperature of the substrate after rising to 240° C. or more and 360° C. or less and holding the temperature for a time indicated below (1) to (3).

(1) In a case in which the thickness of the Sn-plating layer is 0.6 μm or more and less than 0.8 μm: for 1 second or more and 3 seconds or less when the thickness of the Cu-plating layer is 0.03 or more and less than 0.05 μm; for 1 second or more and 6 seconds or less when the thickness of the Cu-plating layer is 0.05 μm or more and less than 0.08 μm; and for 6 seconds or more and 9 seconds or less when the thickness of the Cu-plating layer is 0.08 μm or more and 0.14 μm or less.

(2) In a case in which the thickness of the Sn-plating layer is 0.8 μm or more and less than 1.0 μm: for 3 seconds or more and 6 seconds or less when the thickness of the Cu-plating layer is 0.03 or more and less than 0.05 μm; for 3 seconds or more and 9 seconds or less when the thickness of the Cu-plating layer is 0.05 μm or more and less than 0.08 μm; and for 6 seconds or more and 12 seconds or less when the thickness of the Cu-plating layer is 0.08 μm or more and 0.14 μm or less.

(3) In a case in which the thickness of the Sn-plating layer is 1.0 μm or more and 1.3 μm or less: for 6 seconds or more and 9 seconds or less when the thickness of the Cu-plating layer is 0.03 or more and less than 0.05 μm; for 6 seconds or more and 12 seconds or less when the thickness of the Cu-plating layer is 0.05 μm or more and less than 0.08 μm; and for 9 seconds or more and 12 seconds or less when the thickness of the Cu-plating layer is 0.08 μm or more and 0.14 μm or less.

As described above, by containing Ni and Si in the substrate, $(Cu, Ni, Si)_6 Sn_5$ alloy exists at a lower part of the Cu—Sn alloy layer after the reflow treatment, so that the oil-sump depth Rvk of the Cu—Sn alloy layer can be set to 0.2 μm or more because the asperity of the Cu—Sn alloy layer is precipitous. If the thickness of the Cu-plating layer is less than 0.03 μm, Ni and Si which are supplied from the substrate produce large effects, the thickness of the Sn-based surface layer and the oil-sump depth Rvk of the Cu—Sn alloy layer largely vary depending on places, so that the soldering wettability is deteriorated. If the thickness of the Cu-plating layer exceeds 0.14 μm, since Ni and Si are not easily supplied from the substrate to the Cu—Sn alloy layer, it becomes difficult to form the oil-sump depth Rvk of the Cu—Sn alloy layer to 0.2 µm or more. If the thickness of the Sn-plating layer is less than 0.6 µm, the Sn-based surface layer is thin after reflowing, so that the electrical-connection characteristic is deteriorated. If it exceeds 1.3 µm, it becomes difficult to set the dynamic friction coefficient to 0.3 or less because the exposure of the Cu—Sn alloy layer is small at the surface. In the reflow treatment, it is important that the surface temperature of the substrate is raised to 240° C. or more and 360° C. or less, hold the temperature for 1 second or more and 12 seconds or less and then rapidly cooled. In this case, the holding time is appropriate in a range of 1 second or more and 12 seconds or less according to the thicknesses of the Cu-plating layer and the Sn-plating layer as shown in (1) to (3), so that the holding time is shorter if the plating thickness is thinner and the longer holding time is necessitated if the plating thickness is larger. If the temperature is lower than 240° C. or the holding time is too short, fusion of Sn is not proceeded, so that the desired Cu—Sn alloy layer cannot be obtained; or if the temperature is higher than 360° C. or the holding time is too long, it is not desirable that the exposed rate of the Cu—Sn alloy is too large at the surface and it grows too much and that oxidization of the Sn-based surface layer is proceeded.

Effects of the Invention

According to the present invention, since the dynamic friction coefficient is reduced, both the lower contact resistance and the excellent soldering wettability with the insertion/extraction performance can be satisfied, so that it is appropriate for small terminals because the effect can be obtained even if the load is low. Particularly, it is superior in terminals used for automobiles or electronic parts for a part in which the low insertion power in connecting, the stable contact resistance, and the excellent soldering wettability are necessitated.

DESCRIPTION OF THE PREFERRED EMBODIMENTS

An embodiment of tin-plated copper-alloy material for terminal according to the present invention will be explained.

The tin-plated copper-alloy material for terminal of the present embodiment is constructed as: a Sn-based surface layer is formed on a substrate made of Cu alloy; and a Cu—Sn alloy layer is formed between the Sn-based surface layer and the substrate.

The substrate is copper alloy containing Ni and Si such as Cu—Ni—Si based-alloy, Cu—Ni—Si—Zn based-alloy and the like, furthermore 5% or less by mass in total of one or more selected from a group consisting of Zn, Sn, Fe and Mg if necessary, and a balance which is composed of Cu and unavoidable impurities. Ni and Si are essential components for the reason that Ni and Si are supplied from the substrate in reflowing so that Ni and Si are dissolved in the Cu—Sn alloy layer in order to make an oil-sump depth Rvk of the Cu—Sn alloy layer to 0.2 µm or more by below-mentioned reflow treatment. Appropriate containing amount in the substrate is: 0.5% or more and 5% or less by mass for Ni, and 0.1% or more and 1.5% or less by mass for Si: because if Ni is contained less than 0.5% by mass, an effect of Ni cannot be obtained; and if Si is contained less than 0.1% by mass, an effect of Si cannot be obtained. If Ni is contained more than 5% by mass, cracking may be occurred when casting or hot-rolling; and if Si is contained more than 1.5% by mass, conductivity may be deteriorated.

Zn and Sn improve strength and heat resistance. Fe and Mg improve stress-relief property. In a case in which one or more of Zn, Sn, Fe and Mg is added, it is undesirable that the containing amount exceed 5% by mass in total because the electrical conductivity is deteriorated. Especially, it is desirable to contain all of Zn, Sn, Fe and Mg.

The Cu—Sn alloy layer is formed by the reflow treatment after forming a Cu-plating layer and an Sn-plating layer on the substrate as below-mentioned. Most part of the Cu—Sn alloy layer is $Cu_6Sn_5$. $(Cu, Ni, Si)_6Sn_5$ alloy in which a part of Cu is substituted by Ni and Si in the substrate is thinly formed in the vicinity of a boundary face between the Cu—Sn alloy layer and the substrate. The boundary face between the Cu—Sn alloy layer and the Sn-based surface layer is formed unevenly, so that a part of the Cu—Sn alloy layer ($Cu_6Sn_5$) is exposed at the Sn-based surface layer so as to have 10% or more of an exposed-area rate and 0.2 µm or more in an oil-sump depth Rvk of the Cu—Sn alloy layer. Equivalent-circle diameters of exposed portions are 0.6 µm or more and 2.0 µm or less.

The oil-sump depth Rvk is an average depth of prominent troughs in a surface roughness curve regulated by JIS B0671-2, which is an index indicating an extent of deeper parts than average unevenness. If the value is large, it is indicated that the unevenness is steep by existence of very deep trough.

An average thickness of the Cu—Sn alloy layer is preferably 0.6 µm or more and 1 µm or less. If it is less than 0.6 µm, it is difficult to make the oil-sump depth Rvk of the Cu—Sn alloy layer to 0.2 µm or more. It is set to 1 µm or less because it is wasteful if it is formed to have thickness of 1 µm or more because the Sn-based surface layer should be formed thicker than necessary.

An average thickness of the Sn-based surface layer is set to 0.2 µm or more and 0.6 µm or less. If the thickness is less than 0.2 µm, soldering wettability and electrical-connection reliability may be deteriorated; and if it exceeds 0.6 µm, a surface layer cannot be composite construction of Sn and Cu—Sn and may be filled only by Sn, so that the dynamic friction coefficient is increased. More preferred average thickness of the Sn-based surface layer is 0.25 μm or more and 0.5 μm or less.

At a surface of the Sn-based surface layer, the lower Cu—Sn alloy layer is partially exposed so that an area rate of the exposed part is 10% or more and 40% or less. If the exposed-area rate is less than 10%, the dynamic friction coefficient cannot be suppressed to 0.3 or less; and if it exceeds 40%, the electrical-connection characteristic such as the soldering wettability and the like is deteriorated. More preferred area rate is 10% or more and 30% or less. In this case, the equivalent-circle diameters of the exposed portions are 0.6 μm or more and 2.0 μm or less. If the equivalent-circle diameters of the exposed portions are less than 0.6 μm, it is difficult to set the exposed-area rate of the Cu—Sn alloy layer to 10% or more with the thickness of the Sn-based surface layer satisfying a desired range; and if it exceeds 2.0 μm, the soft Sn between the hard Cu—Sn alloy layer cannot lubricate enough, so that it is difficult to set the dynamic friction coefficient to 0.3 or less. More preferably, it is 0.6 μm or more and 1.3 μm or less.

In the material for terminal having such composition, the boundary face between the Cu—Sn alloy layer and the Sn-based surface layer is formed to have steep uneven shape, so that: soft Sn exists in the steep troughs of the hard Cu—Sn alloy layer in a depth range of hundreds nm from the surface of the Sn-based surface layer, and a part of the hard Cu—Sn alloy layer is slightly exposed at the Sn-based surface layer at the surface; the soft Sn existing in the troughs acts as lubricant; and the dynamic friction coefficient is 0.3 or less. Furthermore, since the exposed-area rate of the Cu—Sn alloy layer is in a limited range of 10% or more and 40% or less, the excellent electrical-connection characteristic of the Sn-based surface layer is not deteriorated.

Next, a method of producing the material for terminal will be explained.

A plate made of copper alloy such as Cu—Ni—Si based-alloy, Cu—Ni—Si—Zn based-alloy or the like containing Ni and Si, furthermore 5% or less by mass in total of one or more selected from a group consisting of Zn, Sn, Fe and Mg if necessary, and a balance which is composed of Cu and unavoidable impurities is prepared for a substrate. Surfaces of the plate are cleaned by treatments of degreasing, pickling and the like, then Cu-plating and Sn-plating are operated in sequence.

In Cu-plating, an ordinary Cu-plating bath can be used; for example, a copper-sulfate plating bath or the like containing copper sulfate ($CuSO_4$) and sulfuric acid ($H_2SO_4$) as major ingredients can be used. Temperature of the plating bath is set to 20° C. or more to 50° C. or less; and current density is set to 1 A/dm$^2$ or more and 20 A/dm$^2$ or less. A film thickness of the Cu-plating layer made by the Cu-plating is set to 0.03 μm or more and 0.14 μm or less. If it is less than 0.03 μm, the alloy substrate has a significant influence, so that the Cu—Sn alloy layer grows to the surface layer, glossiness and the soldering wettability are deteriorated; or if it exceeds 0.14 μm, Ni cannot be supplied enough from the substrate while reflowing, so that the desired uneven shape of the Cu—Sn alloy layer cannot be made.

As a plating bath for making the Sn-plating layer, an ordinary Sn-plating bath can be used; for example, a sulfate bath containing sulfuric acid ($H_2SO_4$) and stannous sulfate ($SnSo_4$) as major ingredients can be used. Temperature of the plating bath is set to 15° C. or more to 35° C. or less; and current density is set to 1 A/dm$^2$ or more to 30 A/dm$^2$ or less. A film thickness of the Sn-plating layer is set to 0.6 μm or more and 1.3 μm or less. If the thickness of the Sn-plating layer is less than 0.6 μm, the Sn-based surface layer is thin after reflowing, so that the electrical-connection characteristic is deteriorated; or if it exceeds 1.3 μm, the exposure of the Cu—Sn alloy layer at the surface is reduced, so that it is difficult to suppress the dynamic friction coefficient to 0.3 or less.

As the condition for the reflow treatment, the substrate is heated for 1 second or more and 12 seconds or less in a reduction atmosphere under a condition of a surface temperature is 240° C. or higher and 360° C. or lower, and then the substrate is rapidly cooled. More preferably, the substrate is heated to 260° C. or more to 300° C. or less at the surface temperature for 5 seconds or more to 10 seconds or less, and then rapidly cooled. In this case, a holding time is adequate in a range of 1 second or more to 12 seconds or less in accordance with the thickness of the Cu-plating layer and the thickness of the Sn-plating layer as below; so that the holding time is short when the plating thickness is thin, and the long holding time is necessary when the plating thickness is thick.

<Holding Time after Increasing Substrate Temperature to 240° C. or More and 360° C. or Less>

(1) In a case in which the thickness of the Sn-plating layer is 0.6 μm or more and less than 0.8 μm: for 1 second or more and 3 seconds or less when the thickness of the Cu-plating layer is 0.03 or more and less than 0.05 μm; for 1 second or more and 6 seconds or less when the thickness of the Cu-plating layer is 0.05 μm or more and less than 0.08 μm; and for 6 seconds or more and 9 seconds or less when the thickness of the Cu-plating layer is 0.08 μm or more and 0.14 μm or less.

(2) In a case in which the thickness of the Sn-plating layer is 0.8 μm or more and less than 1.0 μm: for 3 seconds or more and 6 seconds or less when the thickness of the Cu-plating layer is 0.03 or more and less than 0.05 μm; for 3 seconds or more and 9 seconds or less when the thickness of the Cu-plating layer is 0.05 μm or more and less than 0.08 μm; and for 6 seconds or more and 12 seconds or less when the thickness of the Cu-plating layer is 0.08 μm or more and 0.14 μm or less.

(3) In a case in which the thickness of the Sn-plating layer is 1.0 μm or more and 1.3 μm or less: for 6 seconds or more and 9 seconds or less when the thickness of the Cu-plating layer is 0.03 or more and less than 0.05 μm; for 6 seconds or more and 12 seconds or less when the thickness of the Cu-plating layer is 0.05 μm or more and less than 0.08 μm; and for 9 seconds or more and 12 seconds or less when the thickness of the Cu-plating layer is 0.08 μm or more and 0.14 μm or less.

If it is heated in a state in which the temperature is lower than 240° C. and the holding time is shorter than the time shown in the above (1) to (3), fusion of Sn is not proceeded; or if it is heated in a state in which the temperature is higher than 360° C. and the holding time is longer than the time shown in the above (1) to (3), crystal of Cu—Sn alloy is largely grown so that the desired shape cannot be obtained, and the Sn-based surface layer which remains at the surface is too small (the exposed rate of the Cu—Sn alloy layer to the surface is too large) because the Cu—Sn alloy layer reaches to the surface. Furthermore, if a heating condition is high, it is not desirable because oxidation of the Sn-based surface layer is proceeded.

Examples

The substrate was a plate of copper alloy (Ni; 0.5% or more and 5.0% or less by mass-Zn; 1.0%-Sn; 0% or more and 0.5% or less by mass-Si; 0.1% or more and 1.5% or less by mass-Fe; 0% or more and 0.03% or less by mass-Mg; 0.005% by mass) having a plate thickness of 0.25 mm, and Cu-plating and Sn-plating were performed in sequence. In this case, plating conditions of the Cu-plating and the Sn-plating were the same in Examples and Comparative Examples as shown in Table 1. In Table 1, Dk is an abbreviation for current density for a cathode; and ASD is an abbreviation for A/dm$^2$.

TABLE 1

|  | Cu PLATING |  | Sn PLATING |  |
|---|---|---|---|---|
| COMPOSITION OF PLATING SOLUTION | COPPER SULFATE SULFURIC ACID | 250 g/L 50 g/L | TIN SULFATE SULFURIC ACID ADDITIVE | 75 g/L 85 g/L 10 g/L |
| SOLUTION TEMPERATURE |  | 25° C. |  | 20° C. |
| Dk |  | 5 ASD |  | 5 ASD |

After plating, in Examples and Comparative Examples, the surface temperatures of the substrates were risen to 240° C. or more and 360° C. or less in reduction atmosphere; and subsequently, the substrates were heated for the time shown in the aforementioned (1) to (3) in accordance with the plating thickness, and then water-cooled as reflow treatments.

The holding time shown in (1) to (3) are tabled as Table 2.

TABLE 2

HOLDING TIME (sec) OF SUBSTRATE TEMPERATURE AFTER RISING TO 240° C. OR MORE AND 360° C. OR LESS

|  | Cu-PLATING THICKNESS (μm) | | |
|---|---|---|---|
| Sn-PLATING THICKNESS (μm) | 0.03 or more and less than 0.05 | 0.05 or more and less than 0.08 | 0.08 or more and 0.14 or less |
| 0.6 or more and less than 0.8 | 1 or more and 3 or less | 1 or more and 6 or less | 6 or more and 9 or less |
| 0.8 or more and less than 1.0 | 3 or more and 6 or less | 3 or more and 9 or less | 6 or more and 12 or less |
| 1.0 or more and 1.3 or less | 6 or more and 9 or less | 6 or more and 12 or less | 9 or more and 12 or less |

As Comparative Examples, the substrates in which Ni concentration, Si concentration, Cu-plating thickness and Sn-plating thickness were varied were made.

The conditions for those samples were shown in Table 3.

TABLE 3

|  |  | COMPOSITION OF SUBSTRATE | THICKNESS (μm) OF PLATING LAYER | | REFLOW CONDITION | |
|---|---|---|---|---|---|---|
|  |  |  | Cu | Sn | TEMPERATURE (° C.) OF SUBSTRATE | HOLDING TIME (sec) |
| EXAMPLES | 1 | Ni2.0—Zn1.0—Sn0.5—Si0.5—Fe0.03—Mg0.005 mass % | 0.03 | 0.72 | 245 | 3.0 |
|  | 2 | Ni2.0—Zn1.0—Sn0.5—Si0.5—Fe0.03—Mg0.005 mass % | 0.05 | 0.92 | 270 | 3.0 |
|  | 3 | Ni2.0—Zn1.0—Sn0.5—Si0.5—Fe0.03—Mg0.005 mass % | 0.05 | 0.90 | 270 | 6.0 |
|  | 4 | Ni2.0—Zn1.0—Sn0.5—Si0.5—Fe0.03—Mg0.005 mass % | 0.05 | 0.90 | 270 | 9.0 |
|  | 5 | Ni2.0—Zn1.0—Sn0.5—Si0.5—Fe0.03—Mg0.005 mass % | 0.05 | 0.92 | 250 | 6.0 |
|  | 6 | Ni2.0—Zn1.0—Sn0.5—Si0.5—Fe0.03—Mg0.005 mass % | 0.05 | 0.91 | 350 | 6.0 |
|  | 7 | Ni2.0—Zn1.0—Sn0.5—Si0.5—Fe0.03—Mg0.005 mass % | 0.10 | 0.89 | 270 | 9.0 |
|  | 8 | Ni2.0—Zn1.0—Sn0.5—Si0.5—Fe0.03—Mg0.005 mass % | 0.14 | 0.94 | 270 | 12.0 |
|  | 9 | Ni2.0—Zn1.0—Sn0.5—Si0.5—Fe0.03—Mg0.005 mass % | 0.10 | 0.64 | 245 | 6.0 |
|  | 10 | Ni2.0—Zn1.0—Sn0.5—Si0.5—Fe0.03—Mg0.005 mass % | 0.03 | 1.25 | 360 | 12.0 |
|  | 11 | Ni0.5—Zn1.0—Sn0.5—Si0.5—Fe0.03—Mg0.005 mass % | 0.05 | 0.92 | 270 | 6.0 |
|  | 12 | Ni5.0—Zn1.0—Sn0.5—Si0.5—Fe0.03—Mg0.005 mass % | 0.05 | 0.90 | 270 | 6.0 |
|  | 13 | Ni2.0—Zn1.0—Sn0.5—Si0.1—Fe0.03—Mg0.005 mass % | 0.05 | 0.89 | 270 | 6.0 |
|  | 14 | Ni2.0—Zn1.0—Sn0.5—Si1.5—Fe0.03—Mg0.005 mass % | 0.05 | 0.91 | 270 | 6.0 |
|  | 15 | Ni2.0—Zn1.0—Sn0.5—Si0.5—Fe0.03—Mg0.005 mass % | 0.03 | 1.02 | 360 | 9.0 |
|  | 16 | Ni2.0—Zn1.0—Sn0.5—Si0.5—Fe0.03—Mg0.005 mass % | 0.14 | 0.63 | 245 | 9.0 |
| COMPARATIVE EXAMPLES | 1 | Ni2.0—Zn1.0—Sn0.5—Si0.5—Fe0.03—Mg0.005 mass % | 0.00 | 0.88 | 270 | 6.0 |
|  | 2 | Ni2.0—Zn1.0—Sn0.5—Si0.5—Fe0.03—Mg0.005 mass % | 0.30 | 0.88 | 270 | 3.0 |
|  | 3 | Ni2.0—Zn1.0—Sn0.5—Si0.5—Fe0.03—Mg0.005 mass % | 0.40 | 0.35 | 270 | 1.0 |
|  | 4 | Ni2.0—Zn1.0—Sn0.5—Si0.5—Fe0.03—Mg0.005 mass % | 0.40 | 0.46 | 270 | 2.0 |
|  | 5 | Ni2.0—Zn1.0—Sn0.5—Si0.5—Fe0.03—Mg0.005 mass % | 0.40 | 0.58 | 270 | 3.0 |
|  | 6 | Ni2.0—Zn1.0—Sn0.5—Si0.5—Fe0.03—Mg0.005 mass % | 0.40 | 0.71 | 270 | 3.0 |
|  | 7 | Ni0.3—Zn1.0—Sn0.5—Si0.5—Fe0.03—Mg0.005 mass % | 0.05 | 0.93 | 270 | 6.0 |
|  | 8 | Ni2.0—Zn1.0—Sn0.5—Si0.08—Fe0.03—Mg0.005 mass % | 0.05 | 0.92 | 270 | 6.0 |
|  | 9 | Ni2.0—Zn1.0—Sn0.5—Si0.5—Fe0.03—Mg0.005 mass % | 0.05 | 0.91 | 270 | 2.0 |
|  | 10 | Ni2.0—Zn1.0—Sn0.5—Si0.5—Fe0.03—Mg0.005 mass % | 0.05 | 0.92 | 270 | 12.0 |
|  | 11 | Ni2.0—Zn1.0—Sn0.5—Si0.5—Fe0.03—Mg0.005 mass % | 0.05 | 0.89 | 400 | 3.0 |
|  | 12 | Ni2.0—Zn1.0—Sn0.5—Si0.5—Fe0.03—Mg0.005 mass % | 0.30 | 0.70 | 270 | 6.0 |

With respect to those samples: the thickness of Sn-based surface layer, the thickness of Cu—Sn alloy layer, the oil-sump depth Rvk of the Cu—Sn alloy layer, the exposed-area rate and the equivalent-circle diameter of the exposed portions on the Sn-based surface of the Cu—Sn alloy layer were measured after reflowing; and the dynamic friction coefficient, the soldering wettability, glossiness, and the electrical-connection reliability were evaluated.

The thicknesses of the Sn-based surface layer and the Cu—Sn alloy layer after reflowing were measured by an X-ray fluorescent analysis thickness meter (SFT9400) by SII Nanotechnology Inc. At first, all the thicknesses of the Sn-based surface layers of the samples after reflowing were measured, and then the Sn-based surface layers were removed by soaking for a few minutes in etchant for abrasion of the plate coatings made from components which do not corrode Cu—Sn alloy but etch pure Sn, for example, by L80 or the like by Laybold Co., Ltd. so that the lower Cu—Sn alloy layers were exposed. Then, the thicknesses of the Cu—Sn alloy layers in pure Sn conversion were measured. Finally, (the thicknesses of all the Sn-based surface layers minus the thickness of the Cu—Sn alloy layer in pure Sn conversion) was defined as the thickness of the Sn-based surface layer.

The oil-sump depth Rvk of the Cu—Sn alloy layer was obtained by: removing the Sn-based surface layer by soaking in etchant for abrasion of the Sn-plate coating so that the lower Cu—Sn alloy layer was exposed; and then obtaining from an average of measured Rvk value measured at 10 points including 5 points along a longitudinal direction and 5 points along a short direction in a condition of an object lens of 150 magnifications (a measuring field of 94 μm×70 μm) using a laser microscope (VK-9700) made by Keyence Corporation.

The exposed-area rate and the equivalent-circle diameter of the exposed portions in the Cu—Sn alloy layer were observed at an area of 100×100 μm by a scanning ion microscope after removing surface-oxide films. In accordance with a measurement principle, if $Cu_6Sn_5$ exists in a depth area of substantially 20 nm from an outermost surface, it is imaged by white; so that an area-rate of the white portions with respect to a whole area of the measuring portion was regarded as the exposed-area rate of the Cu—Sn alloy using an image processing software, the equivalent-circle diameters were calculated from the white portions, and an average value of them was regarded as the equivalent-circle diameter of the exposed portions in Cu—Sn alloy.

Figure 7:
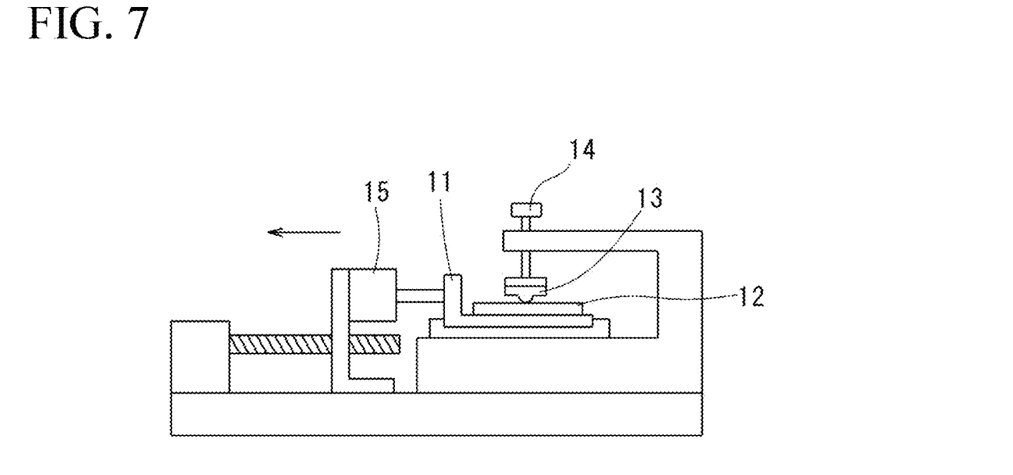
FIG. 7 is a front view conceptually showing an apparatus for measuring a dynamic friction coefficient of conductive members.

The dynamic friction coefficient was obtained by: preparing plate-shaped male test pieces and half-spherical female test pieces having an inner diameter of 1.5 mm of the samples so as to simulate a contact of a male terminal and a female terminal in an insertion-type connector; and measuring a friction force between the test pieces using a friction-measuring instrument (μV1000) made by Trinity Lab INC. It is explained with reference to FIG. 7 that: the male test piece 12 was fixed on a horizontal table 11, a half-spherical convex of the female test piece 13 was deposited on the male test piece 12 so that plated surfaces were in contact with each other, and the male test piece 12 was pressed at a load P of 100 gf or more to 500 gf or less by the female test piece 13 with a weight 14. In a state in which the load P was applied, a friction force F was measured by a load cell 15 when the male test piece 12 was drawn in the horizontal direction shown by an arrow for 10 mm at a frictional speed of 80 mm/minute. The dynamic friction coefficient (=Fav/P) was obtained from an average value Fav of the friction force F and the load P. Both a case in which the load was 0.98 N (100 gf) and a case in which the load was 4.9 N (500 gf) were described in Table 3.

With respect to the soldering wettability, the test pieces were cut out to have width of 10 mm; so that zero-cross time was measured by a meniscograph method using a rosin-based active flux. (The test pieces were soaked in Sn-37% Pb solder with solder-bath temperature of 230° C.; so that the soldering wettability was measured in a condition in which a soaking speed was 2 mm/sec, a soaking depth was 2 mm, and a soaking time was 10 seconds.) If the soldering zero-cross time was 3 seconds or less, it was evaluated as "O"; or it was more than 3 seconds, it was evaluated as "X".

The glossiness was measured using a gloss meter (model number: PG-1M) made by Nippon Denshoku Industries Co., Ltd. with an entry angle of 60° in accordance with JIS Z 8741.

In order to evaluate the electrical-connection reliability, the contact resistance was measured with heating in the atmosphere at 150° C.×500 hours. The measuring method was in accordance with JIS-C-5402, load variation from 0 to 50 g—contact resistance in sliding type (1 mm) was measured using a four-terminal contact-resistance test equipment (made by Yamasaki-Seiki Co., Ltd.: CRS-113-AU), so that a contact resistance value was evaluated when the load was 50 g.

Those measurement results and the evaluation results are described in Table 4.

TABLE 4

| | | LAYER THICKNESS (μm) AFTER REFLOWING | | OIL-SUMP DEPTH | EXPOSED RATE (%) | EQUIVALENT-CIRCLE DIAMETER (μm) | DYNAMIC FRICTION COEFFICIENT |
|---|---|---|---|---|---|---|---|
| | | Sn | Cu—Sn | Rvk (μm) | OF $Cu_6Sn_5$ | OF EXPOSED $Cu_6Sn_5$ | LOAD 500 gf |
| EXAMPLES | 1 | 0.27 | 0.65 | 0.32 | 30 | 0.96 | 0.20 |
| | 2 | 0.43 | 0.71 | 0.27 | 15 | 0.68 | 0.25 |
| | 3 | 0.36 | 0.78 | 0.31 | 24 | 0.81 | 0.23 |
| | 4 | 0.26 | 0.92 | 0.36 | 37 | 1.04 | 0.21 |
| | 5 | 0.42 | 0.72 | 0.32 | 14 | 0.65 | 0.22 |
| | 6 | 0.28 | 0.91 | 0.32 | 28 | 0.91 | 0.23 |
| | 7 | 0.23 | 0.95 | 0.35 | 31 | 1.25 | 0.21 |
| | 8 | 0.32 | 0.90 | 0.24 | 10 | 0.85 | 0.25 |
| | 9 | 0.22 | 0.60 | 0.22 | 20 | 1.04 | 0.26 |
| | 10 | 0.57 | 0.98 | 0.39 | 15 | 0.79 | 0.19 |
| | 11 | 0.42 | 0.72 | 0.30 | 18 | 0.71 | 0.24 |
| | 12 | 0.31 | 0.85 | 0.31 | 27 | 0.83 | 0.23 |
| | 13 | 0.40 | 0.71 | 0.30 | 16 | 0.81 | 0.24 |

TABLE 4-continued

|  |  | | | | | | |
|---|---|---|---|---|---|---|---|
|  | 14 | 0.34 | 0.81 | 0.32 | 26 | 0.85 | 0.22 |
|  | 15 | 0.22 | 1.1 | 0.28 | 36 | 1.91 | 0.27 |
|  | 16 | 0.20 | 0.60 | 0.20 | 39 | 2.08 | 0.28 |
| COMPARATIVE EXAMPLE | 1 | 0.19 | 0.99 | 0.39 | 45 | 2.22 | 0.20 |
|  | 2 | 0.47 | 0.59 | 0.18 | 0.2 | 0.53 | 0.39 |
|  | 3 | 0.01 | 0.48 | 0.12 | 75 | 4.42 | 0.27 |
|  | 4 | 0.09 | 0.52 | 0.19 | 45 | 3.80 | 0.28 |
|  | 5 | 0.17 | 0.58 | 0.15 | 34 | 2.02 | 0.31 |
|  | 6 | 0.31 | 0.58 | 0.16 | 4 | 0.86 | 0.38 |
|  | 7 | 0.49 | 0.63 | 0.19 | 7 | 0.97 | 0.36 |
|  | 8 | 0.47 | 0.65 | 0.18 | 5 | 0.81 | 0.35 |
|  | 9 | 0.48 | 0.62 | 0.14 | 8 | 1.04 | 0.31 |
|  | 10 | 0.12 | 1.2 | 0.38 | 58 | 2.75 | 0.22 |
|  | 11 | 0.10 | 1.1 | 0.34 | 53 | 2.81 | 0.21 |
|  | 12 | 0.27 | 0.60 | 0.15 | 16 | 1.48 | 0.32 |

|  |  | DYNAMIC FRICTION COEFFICIENT LOAD 100 gf | SOLDERING WETTABILITY | GLOSSINESS ($\times 10^2$ GU) | CONTACT RESISTANCE (mΩ) |
|---|---|---|---|---|---|
| EXAMPLES | 1 | 0.21 | ○ | 7.6 | 5.31 |
|  | 2 | 0.29 | ○ | 8.2 | 2.51 |
|  | 3 | 0.26 | ○ | 7.7 | 3.01 |
|  | 4 | 0.23 | ○ | 7.3 | 6.21 |
|  | 5 | 0.24 | ○ | 8.2 | 3.56 |
|  | 6 | 0.24 | ○ | 7.9 | 3.01 |
|  | 7 | 0.22 | ○ | 7.6 | 5.36 |
|  | 8 | 0.29 | ○ | 8.2 | 4.02 |
|  | 9 | 0.28 | ○ | 7.5 | 7.55 |
|  | 10 | 0.20 | ○ | 7.6 | 3.22 |
|  | 11 | 0.27 | ○ | 8.1 | 2.60 |
|  | 12 | 0.26 | ○ | 7.9 | 3.11 |
|  | 13 | 0.28 | ○ | 8.0 | 2.62 |
|  | 14 | 0.25 | ○ | 7.5 | 2.87 |
|  | 15 | 0.29 | ○ | 7.2 | 7.92 |
|  | 16 | 0.30 | ○ | 7.1 | 8.37 |
| COMPARATIVE EXAMPLE | 1 | 0.21 | X | 6.6 | 11.27 |
|  | 2 | 0.51 | ○ | 8.6 | 2.18 |
|  | 3 | 0.28 | X | 6.1 | 18.30 |
|  | 4 | 0.30 | X | 6.7 | 14.59 |
|  | 5 | 0.36 | X | 6.9 | 9.21 |
|  | 6 | 0.48 | ○ | 8.5 | 3.62 |
|  | 7 | 0.46 | ○ | 8.3 | 2.90 |
|  | 8 | 0.43 | ○ | 8.3 | 2.73 |
|  | 9 | 0.35 | ○ | 8.5 | 2.78 |
|  | 10 | 0.23 | X | 6.3 | 11.08 |
|  | 11 | 0.22 | X | 6.4 | 10.03 |
|  | 12 | 0.39 | ○ | 8.0 | 4.75 |

Obviously from Table 4, in every Example, the dynamic friction coefficient was small as 0.3 or less, the soldering wettability was good, the glossiness was high, the exterior appearance was good and the contact resistance was 10 mΩ or less. On the other hand, the oil-sump depth Rvk of the Cu—Sn alloy layer is less than 0.2 μm in Comparative Examples 2, 5, 6, 7, 8, 9 and 12; the soldering wettability and the glossiness of Comparative Example 1 were poor by being largely influenced by the alloy substrate; and in Comparative Examples 3, 4, 10 and 11, even though the dynamic friction coefficient was 0.3 or less, because the thickness of Sn is thin, the soldering wettability was poor, the glossiness was low, and the contact resistance exceeds 10 mΩ so that the electrical reliability was deteriorated.

Figure 1:
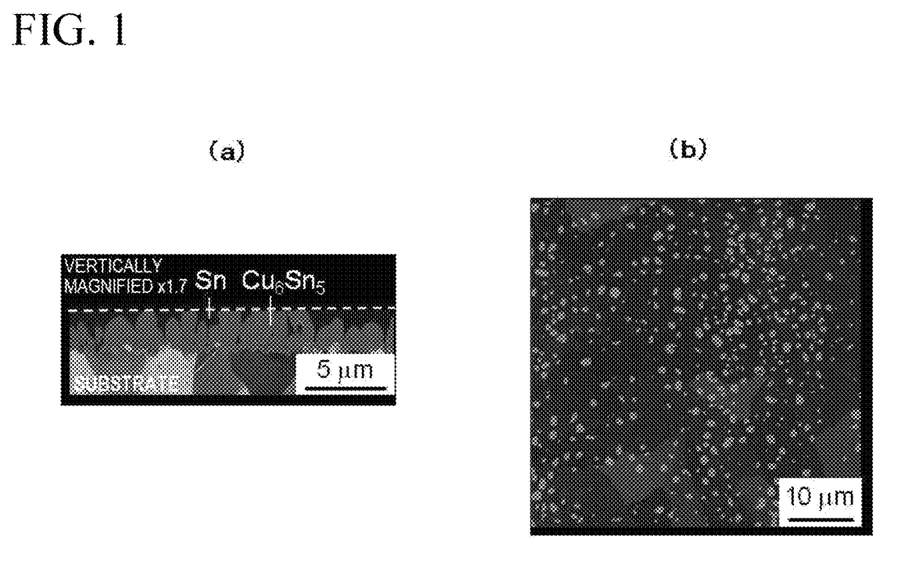
FIG. 1 is a photograph by a scanning ion microscope (SIM) of copper-alloy material for terminal of an Example, including a part (a) showing a vertical section and a part (b) showing a surface-state.
Figure 2:
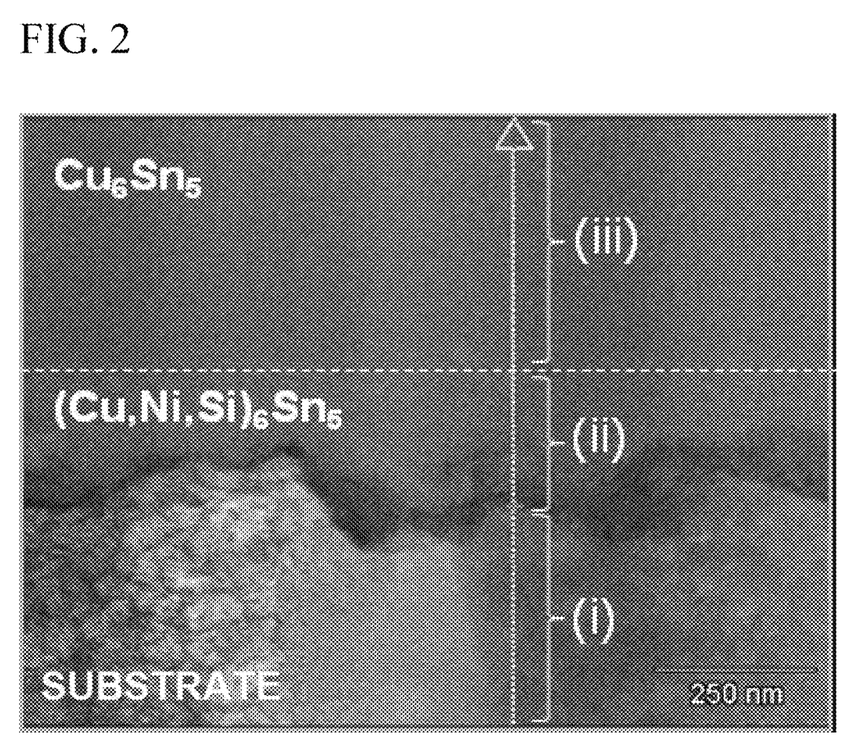
FIG. 2 is a sectional photograph by a scanning-transmission electron microscope (STEM) showing a boundary face between a substrate and a Cu—Sn alloy layer of the copper-alloy material for terminal of the Example.
Figure 3:
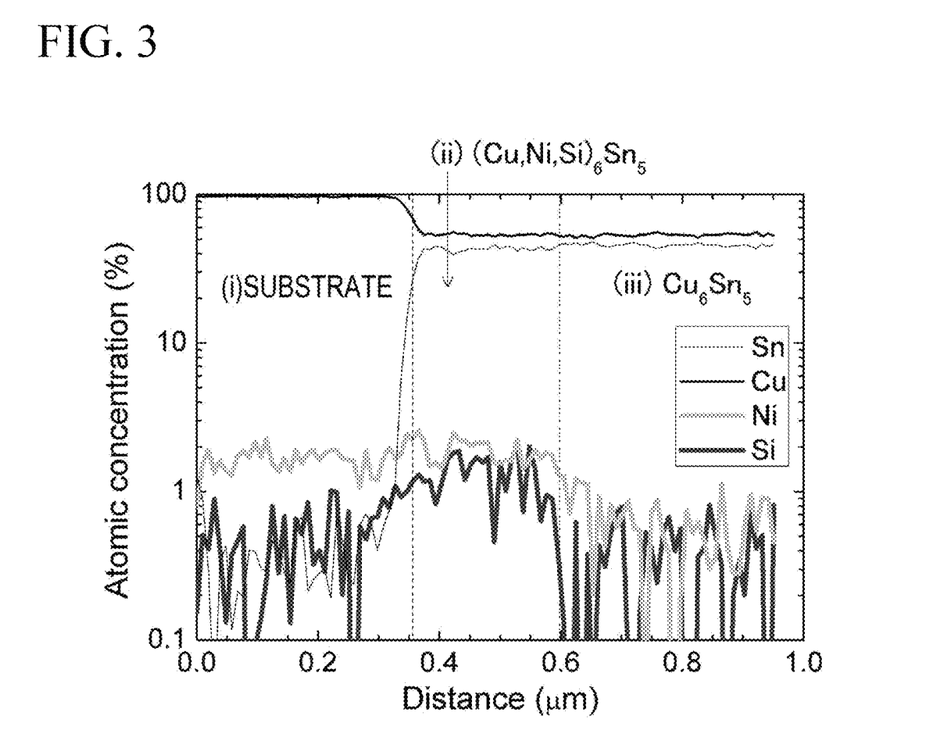
FIG. 3 is a composition profile analyzed by EDS along the arrow in FIG. 2.
Figure 4:
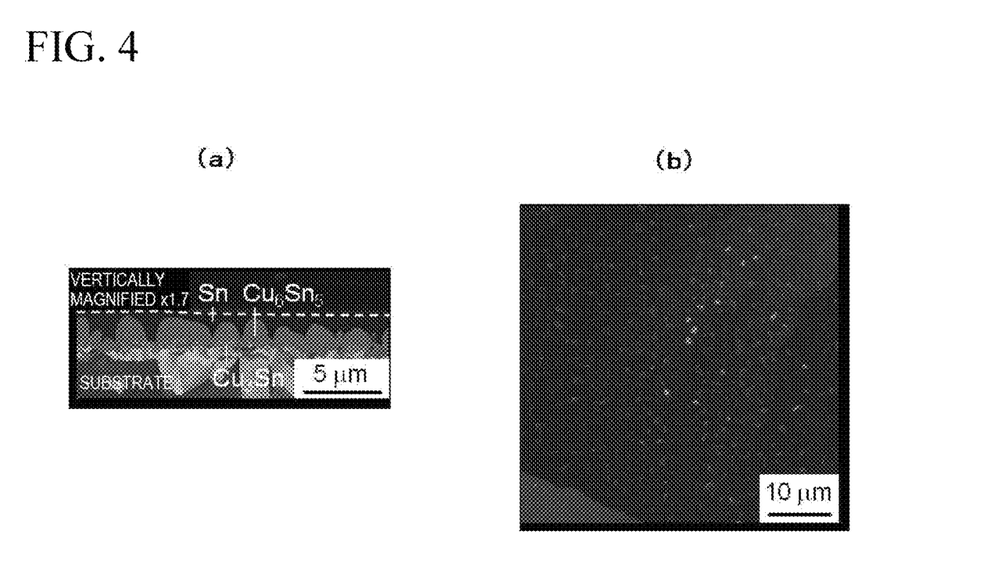
FIG. 4 is a photograph by a scanning ion microscope (SIM) of copper-alloy material for terminal of a Comparative Example, showing a part (a) of a vertical section and a part (b) of a surface-state.
Figure 5:
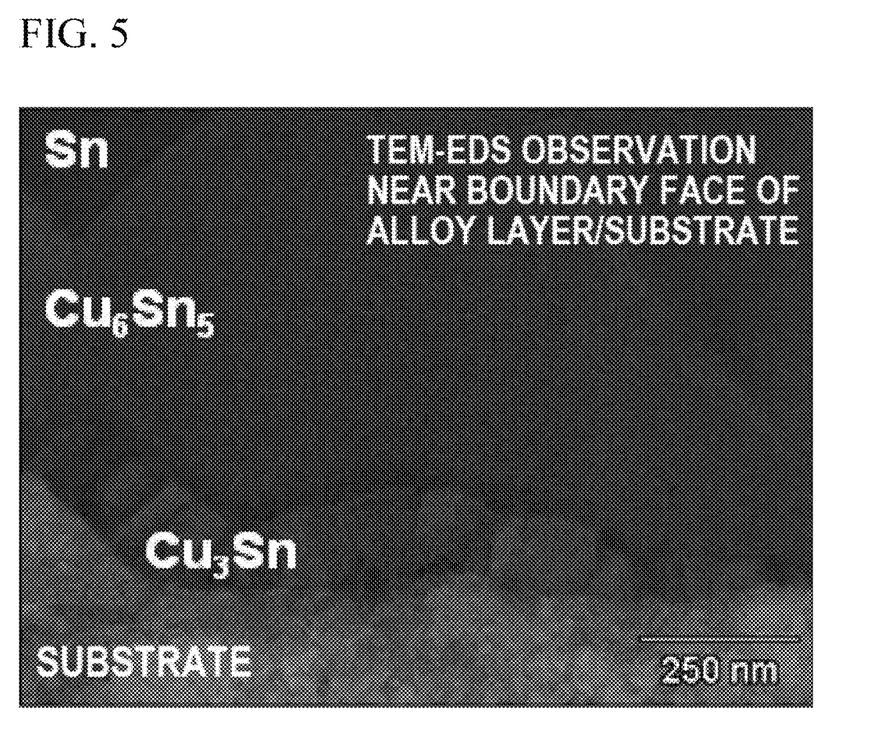
FIG. 5 is a sectional photograph by a scanning-transmission electron microscope (STEM) showing a boundary face between a substrate and a Cu—Sn alloy layer of the copper-alloy material for terminal of the Comparative Example.
Figure 6:
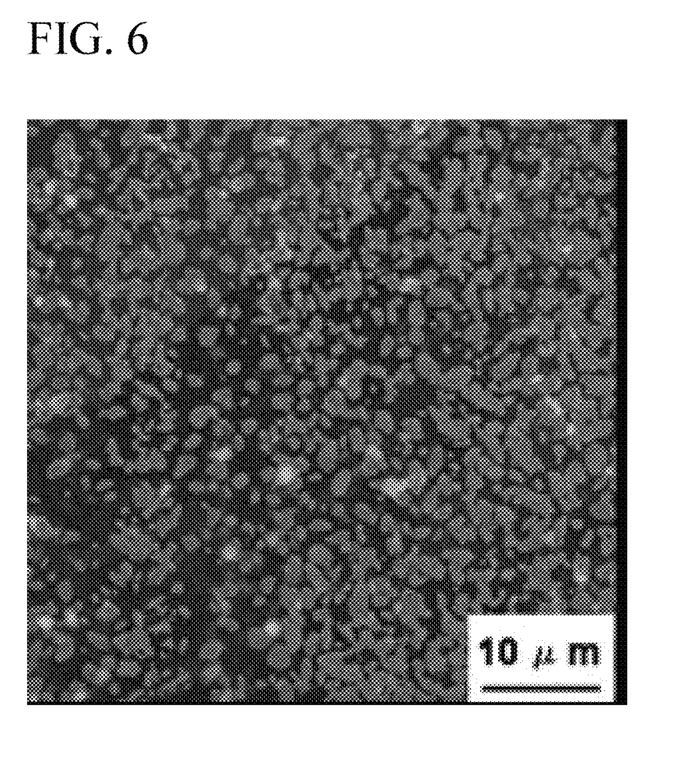
FIG. 6 is a photograph by a scanning ion microscope (SIM) showing a surface-state of the copper-alloy material for terminal of the Comparative Example.

FIG. 1 and FIG. 2 are photomicrographs of the sample of Example 2; and FIG. 3 is a composition profile in which a section of Example 2 is analyzed by an EDS (an Energy Dispersive X-ray Spectrometer). In FIG. 2 and FIG. 3; a part (i) is the substrate, a part (ii) is the $(Cu, Ni, Si)_6Sn_5$ layer, and a part (iii) is the $Cu_6Sn_5$ layer. FIG. 4 and FIG. 5 are photomicrographs of Comparative Example 2. FIG. 6 is a photomicrograph of Comparative Example 3. As recognized by comparing those photographs, in the samples of Examples, the asperity of the Cu—Sn alloy layer is precipitous; $(Cu, Ni, Si)_6Sn_5$ which is a compound in which a part of Cu was substituted by Ni and Si was slightly found in the vicinity of the boundary face of the Cu—Sn alloy layer at the substrate side (below the broken line in FIG. 2); and a part of the Cu—Sn alloy layer was exposed with being scattered at the Sn-based surface layer and having small equivalent-circle diameters. The samples of the Comparative Examples, as shown in FIG. 5, has constitution in which: a relatively thick $Cu_3Sn$ layer was found at a lower part of the Cu—Sn alloy layer; the $Cu_6Sn_5$ layer was laminated on the $Cu_3Sn$ layer; and the asperity of the Cu—Sn alloy layer was rough and gentle so that the exposure at the surface was small. As shown in FIG. 6, the equivalent-circle diameter of the exposed portions of the Cu—Sn alloy layer was large.

Industrial Applicability

The tin-plated copper-alloy material for terminal of the present invention is applicable to a terminal for a connector used for connecting electrical wiring of automobiles or personal products, in particular, to a terminal for a multi-pin connector.

DESCRIPTION OF THE REFERENCE SYMBOLS

11 Table
12 Male test piece
13 Female test piece
14 Weight
15 Load cell

The invention claimed is:

1. A tin-plated copper-alloy material for terminal comprising a Sn-based surface layer is formed on a surface of a substrate made of Cu alloy, and a Cu—Sn alloy layer is formed between the Sn-based surface layer and the substrate, wherein:

the Cu—Sn alloy layer is an alloy layer containing $Cu_6Sn_5$ as a major proportion and having a compound in which a part of Cu in the $Cu_6Sn_5$ is substituted by Ni and Si in the vicinity of a boundary face at the substrate side;

an oil-sump depth Rvk of the Cu—Sn alloy layer is 0.2 µm or more;

an average thickness of the Sn-based surface layer is 0.2 µm or more and 0.6 µm or less;

an area rate of the Cu—Sn alloy layer exposed at a top surface of the tin-plated copper-alloy material for terminal is 10% or more and 40% or less of the top surface of the tin-plated copper-alloy material for terminal;

the Cu—Sn alloy layer exposed at the top surface of the tin-plated copper-alloy material for terminal is exposed in equivalent-circle diameters; and a dynamic friction coefficient of the tin-plated copper-alloy material for terminal is 0.3 or less;

wherein the tin-plated copper-alloy material for terminal is prepared by a method in which a Sn-based surface layer is formed through a medium of a Cu—Sn alloy layer on a substrate by reflowing after forming a Cu-plating layer and a Sn-plating layer in sequence on the substrate made of Cu alloy, comprising steps of:

using the substrate containing 0.5% or more and 5% or less by mass of Ni and 0.1% or more and 1.5% or less by mass of Si; furthermore 5% or less by mass in total of one or more selected from a group consisting of Zn, Sn, Fe and Mg if necessary; and a balance which is composed of Cu and unavoidable impurities;

setting a thickness of the Cu-plating layer to 0.03 µm or more and 0.14 µm or less;

setting a thickness of the Sn-plating layer to 0.6 µm or more and 1.3 µm or less; and reflowing by rapid-cooling surface temperature of the substrate after rising to 240° C. or more and 360° C. or less and holding the temperature for a time indicated below (1) to (3):

(1) in a case in which the thickness of the Sn-plating layer is 0.6 µm or more and less than 0.8 µm: for 1 second or more and 3 seconds or less when the thickness of the Cu-plating layer is 0.03 or more and less than 0.05 µm; for 1 second or more and 6 seconds or less when the thickness of the Cu-plating layer is 0.05 µm or more and less than 0.08 µm; and for 6 seconds or more and 9 seconds or less when the thickness of the Cu-plating layer is 0.08 µm or more and 0.14 µm or less (2) in a case in which the thickness of the Sn-plating layer is 0.8 µm or more and less than 1.0 µm: for 3 seconds or more and 6 seconds or less when the thickness of the Cu-plating layer is 0.03 or more and less than 0.05 µm; for 3 seconds or more and 9 seconds or less when the thickness of the Cu-plating layer is 0.05 µm or more and less than 0.08 µm; and for 6 seconds or more and 12 seconds or less when the thickness of the Cu-plating layer is 0.08 µm or more and 0.14 µm or less (3) in a case in which the thickness of the Sn-plating layer is 1.0 µm or more and 1.3 µm or less: for 6 seconds or more and 9 seconds or less when the thickness of the Cu-plating layer is 0.03 or more and less than 0.05 µm; for 6 seconds or more and 12 seconds or less when the thickness of the Cu-plating layer is 0.05 µm or more and less than 0.08 µm; and for 9 seconds or more and 12 seconds or less when the thickness of the Cu-plating layer is 0.08 µm or more and 0.14 µm or less.

2. The tin-plated copper-alloy material for terminal according to claim 1, wherein equivalent-circle diameters of exposed portions of the Cu—Sn alloy layer exposed at the surface of the Sn-based surface layer are 0.6 µm or more to 2.0 µm or less.

3. The tin-plated copper-alloy material for terminal according to claim 1, wherein an average thickness of the Cu—Sn alloy layer is 0.6 µm or more and 1 µm or less.

4. The tin-plated copper-alloy material for terminal according to claim 1, wherein the substrate contains: 0.5% or more and 5% or less by mass of Ni and 0.1% or more and 1.5% or less by mass of Si; furthermore 5% or less by mass in total of one or more selected from a group consisting of Zn, Sn, Fe and Mg if necessary; and a balance which is composed of Cu and unavoidable impurities.

5. The tin-plated copper-alloy material for terminal according to claim 3, wherein the substrate contains: 0.5% or more and 5% or less by mass of Ni and 0.1% or more and 1.5% or less by mass of Si; furthermore 5% or less by mass in total of one or more selected from a group consisting of Zn, Sn, Fe and Mg if necessary; and a balance which is composed of Cu and unavoidable impurities.

* * * * *